UNITED STATES PATENT OFFICE.

BENJAMIN A. LAVENDER AND HENRY LOWE, OF BALTIMORE, MARYLAND.

IMPROVEMENT IN TREATING CANE FIBER FOR PAPER AND OTHER PURPOSES.

Specification forming part of Letters Patent No. 10,722, dated April 4, 1854.

*To all whom it may concern:*

Be it known that we, BENJAMIN A. LAVENDER and HENRY LOWE, of the city and county of Baltimore, and State of Maryland, have invented a new and improved method of making what we call "Cane-Hemp," and which is useful for making paper, cordage, rope, bagging, matting, and other coarse fabrics; and the following is a description of said invention, and the manner and process of making the same in full, clear, and exact terms.

We take the article called "reeds" in the Carolinas, used for fishing-poles, and farther south and west called "cane," and by botanists called the "*Urundinavia macrosperma of Michaux.*" These are first passed through rollers, so as to crush them flat, and cut into convenient lengths of three or four feet, and then laid compactly in a suitable vessel. We prefer a tub or vat of yellow-pine plank, because it is a wood not easily affected by acid. Muriatic or sulphuric acid of a strength of about 18° Baumé, diluted with an equal quantity, in weight, of water, is then poured upon the cane, enough to cover it. Suffer the cane to remain in this position until fully disintegrated, which is ascertained on trial by the fibers easily separating and being very tender. The time required for maceration is two or three days. Then draw the acid off for future use. Then add cream of lime or any carbonated or caustic alkali in quantity sufficient to neutralize the acid absorbed by the cane, with water sufficient to cover it, and let it remain in this alkaline solution ten or twelve hours. Let the solution then be drawn off, and take the cane out carefully, as it is tender, and dry it in the most convenient mode. When thoroughly dry the fibers, though they separate from each other easily, yet they retain their original strength and tenacity. Pass the cane then through a break similar to that used for breaking flax and hemp, and cleanse it, and it becomes fit for use and should be put up with the fibers laid out straight and regular, as Kentucky hemp is prepared for market, unless it is put up expressly for paper-making, in which case it is unnecessary to use such care in putting it up straight.

We also treat other vegetable fibrous substances in this manner—such as pine wood, gum-cedar, poplar, oak, &c.—but we prefer and therefore specify the *Urundinavia macrosperma* because we believe it to be best adapted on account of the tenacity of its fiber and the very great abundance of it; and What we consider as our discovery or invention, and desire to secure by Letters Patent, is—

Removing the gummy and other substances which cause coherence from the cane and other vegetable fibrous substances by means of muriatic or sulphuric acid of a mean strength of 9°.

BEN. A. LAVENDER.
HENRY LOWE.

Witnesses:
WM. H. HAYWARD,
EDWD. G. STERN.